United States Patent
Ornstein (10) Patent No.: US 8,774,776 B1
(45) Date of Patent: Jul. 8, 2014

(54) ALERT DEVICE FOR MOBILE COMMUNICATIONS DEVICES

(71) Applicant: Adam E Ornstein, New York, NY (US)

(72) Inventor: Adam E Ornstein, New York, NY (US)

( * ) Notice: Subject to any disclaimer, the term of this patent is extended or adjusted under 35 U.S.C. 154(b) by 0 days.

(21) Appl. No.: 13/684,293

(22) Filed: Nov. 23, 2012

Related U.S. Application Data (60) Provisional application No. 61/563,493, filed on Nov. 23, 2011.

(51) Int. Cl.
*H04B 1/38* (2006.01)

(52) U.S. Cl.
USPC ........................................ 455/414.1; 455/567

(58) Field of Classification Search
None
See application file for complete search history.

(56) References Cited

U.S. PATENT DOCUMENTS

| | | | |
|---|---|---|---|
| 2006/0019649 A1* | 1/2006 | Feinleib et al. | 455/420 |
| 2009/0088207 A1* | 4/2009 | Sweeney et al. | 455/557 |
| 2009/0191921 A1* | 7/2009 | Manatrey | 455/567 |
| 2012/0052808 A1* | 3/2012 | McMeans | 455/41.3 |
| 2012/0108215 A1* | 5/2012 | Kameli | 455/412.2 |

* cited by examiner

*Primary Examiner* — Erika A Washington
(74) *Attorney, Agent, or Firm* — Byrne Poh LLP (57) ABSTRACT

An alert device for mobile devices is provided. In some embodiments, an alert device for a mobile communications device, the alert device comprising a housing that includes control circuitry, wherein the control circuitry is configured to: associate wirelessly with the mobile communications device; in response to associating with the mobile communications device, receive a plurality of mobile communications device settings associated with the mobile device, wherein the plurality of mobile communications device settings include a ringtone corresponding to incoming communications and a ring volume setting; detect an incoming communication to the mobile communications device; determine a status of the mobile communications device in response to detecting the incoming communication; and provide an alert to a user of the mobile communications device.

15 Claims, 8 Drawing Sheets

ALERT DEVICE FOR MOBILE COMMUNICATIONS DEVICES

CROSS REFERENCE TO RELATED APPLICATIONS

This application claims the benefit of U.S. Provisional Patent Application No. 61/563,493, filed Nov. 23, 2011, which is hereby incorporated by reference herein in its entirety.

TECHNICAL FIELD

In accordance with various embodiments of the disclosed subject matter, an alarm device for mobile communications devices is provided. More particularly, the disclosed subject matter relates to a wireless alert attachment for mobile communications devices.

BACKGROUND

When a communication, such as a call or a message, is received on a mobile telephone, the individual retrieves the mobile telephone to answer the communication. Alternatively, the individual may have a headset or other hands-free interface attached to the mobile telephone to answer the communication. Answering these communications may be increasingly difficult as some individuals have multiple mobile telephones or devices—e.g., a mobile telephone for personal use and a mobile telephone for business use. This may also be increasingly difficult when such mobile telephones are placed in bags or when the individual is not near the mobile telephone as an incoming communication is received. As a result, the individual may miss the communication altogether or not be aware that the incoming communication is being received.

In addition to answering calls and/or responding to messages on multiple devices, keeping track of these devices can also be difficult.

SUMMARY

In accordance with various embodiments of the disclosed subject matter, an alert device for a mobile communications device is provided.

In some embodiments, the alert device comprises a housing that includes control circuitry, wherein the control circuitry is configured to: associate wirelessly with the mobile communications device; in response to associating with the mobile communications device, receive a plurality of mobile communications device settings associated with the mobile device, wherein the plurality of mobile communications device settings include a ringtone corresponding to incoming communications and a ring volume setting; detect an incoming communication to the mobile communications device; determine a status of the mobile communications device in response to detecting the incoming communication; and provide an alert to a user of the mobile communications device.

In some embodiments, in response to detecting that the incoming communication is a call and the status of the mobile communications device indicates that the mobile communications device is available, provide the alert that includes playing back the ringtone through a speaker connected to the control circuitry at the ring volume setting. In some embodiments, in response to detecting that the incoming communication is a call and the status of the mobile communications device indicates that the mobile communications device is engaged on another call, provide the alert that includes flashing one or more light emitting diodes connected to the control circuitry. In some embodiments, in response to detecting that the status of the mobile communications device indicates that the mobile communications device is a distance away from the alert device, provide the alert that includes an audible alarm through the speaker and flashing the one or more light emitting diodes.

BRIEF DESCRIPTION OF THE DRAWINGS

Various objects, features, and advantages of the disclosed subject matter can be more fully appreciated with reference to the following detailed description of the invention when considered in connection with the following drawing, in which like reference numerals identify like elements.

DETAILED DESCRIPTION

Generally speaking, a wireless alert attachment is provided, where the wireless alert attachment is in communications with and separate from a mobile device. Based on information derived from the communications between the wireless alert attachment and the mobile device, the wireless alert attachment can be used to provide a mobile device user with a plurality of alerts and/or notifications. For example, in some embodiments, the wireless alert attachment can connect to a mobile device and, in response to the mobile device receiving a call, display a real-time alert indicating the received call to the user of the mobile device. In another example, in some embodiments, the wireless alert attachment can connect to a mobile device and, in response to the mobile device receiving a short message system (SMS) text message, instant message, or any other suitable message, display a real-time alert indicating the received message to the user of the mobile device (e.g., a different alert to indicate a message as opposed to an incoming call). In yet another example, in some embodiments, the wireless alert attachment can connect to a mobile device, determine a distance between the mobile device and the wireless alert attachment, and, upon determining that the mobile device and the wireless alert attachment are separated by a distance greater than a predetermined distance, present one or more alerts indicating that the user recover or locate the mobile device as it may be lost, misplaced, and/or stolen.

In addition, the wireless alert attachment can provide a variety of alerts and/or notifications. For example, the wireless alert attachment can provide an audible alert (e.g., a chirp, a ringing, playback of an audio file, etc.), a visual alert (e.g., one or more light emitting diodes, a messaging display, etc.), and/or a tactile alert (e.g., a vibration element). In another example, these alerts and/or notifications can be configured by the mobile device user—e.g., an audible alert for incoming calls that retrieves the corresponding ringtone from the mobile and all possible alerts for indicating that the mobile device user misplaced or left the mobile device behind.

It should be noted that, although the embodiments described herein generally describe that the wireless alert attachment is used with a mobile telephone, this is merely illustrative. As used herein, a mobile device can be any suitable wireless device, such as a cellular telephone, a tablet computing device, a personal data assistant (PDA), a portable email device, a gaming device, or any suitable device capable of wirelessly communicating (e.g., via Bluetooth) with other devices.

Figure 3:
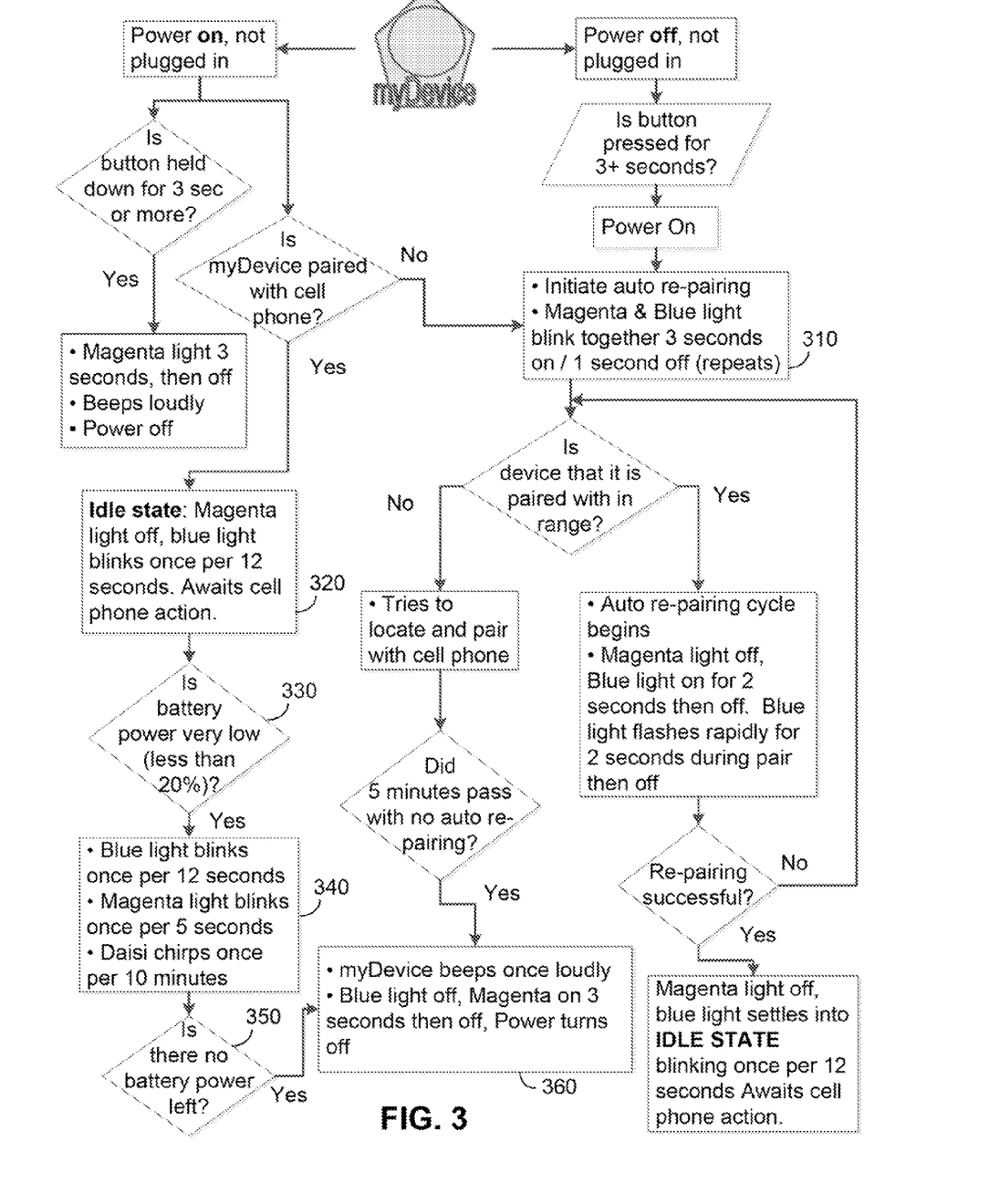
FIGS. 3 and 4 are flowcharts of an illustrative process for providing various auditory and visual alerts on an alert device based on power schemes in accordance with some embodiments of the disclosed subject matter.

In some embodiments, the wireless alert attachment can be coupled with a mobile device. For example, as described in FIG. 3, the wireless alert attachment can be paired or associated with a mobile device in response to receiving instructions from a user of the mobile device (e.g., placing the mobile device in a discovery mode, depressing a button on the mobile device for a predetermined amount of time, transmitting pin codes, etc.). In a more particular example, the wireless alert attachment can establish a relationship with the mobile device using a Bluetooth mechanism. As shown in FIG. 3, when the wireless alert attachment is powered on and not charging (e.g., the wireless alert attachment can be powered on and off by depressing a button on the wireless alert attachment for a predetermined amount of time), the wireless alert attachment can associate with the mobile device at 310. It should be noted that, in order to allow the wireless alert attachment to associate with a new mobile device (as opposed to a known device), the wireless alert attachment can be plugged into a power outlet and then associated with the new mobile device. It should also be noted that depressing the button on the wireless alert attachment can, in some embodiments, allow the wireless alert attachment to associated with known or previously connected devices.

It should be noted that, although the embodiments described herein generally describe the use of a Bluetooth mechanism for associating a wireless alert attachment with a mobile device, this is merely illustrative. Any suitable wireless communications mechanism can be used, such as a radio frequency (RF) or infrared.

In some embodiments, multiple mobile devices can be coupled or associated with the wireless alert attachment. For example, a user with multiple mobile devices (e.g., a mobile telephone for business use, a mobile telephone for personal use, and a tablet computing device) can connect each of the mobile devices with a single wireless alert attachment.

In some embodiments, multiple wireless alert attachments can be associated with one or more mobile devices. For example, a user with multiple mobile devices can associate a wireless alert attachment with each device. In another example, a user with multiple attachment locations (e.g., a bag, a jacket pocket, etc.) can associate multiple wireless alert attachment with a single mobile device.

In response to coupling or associating the wireless alert attachment with a mobile device, the wireless alert attachment can present the user of the mobile device with one or more alerts or notifications.

For example, as shown in FIG. 3, the wireless alert attachment can provide the user with an alert to indicate to the user that the wireless alert attachment has successfully associated with a mobile device. In a more particular example, upon depressing a button on the wireless alert attachment for a predetermined amount of time (e.g., greater than three seconds) and placing the mobile device in discovery mode, one of the light emitting diodes on the wireless alert attachment can flash in a particular pattern. As shown in FIG. 3, at 320, in response to pairing or associating the wireless alert attachment with a mobile device, the wireless alert attachment can provide a visual alert—e.g., a blue LED light that blinks once per twelve seconds.

In another example, as also shown in FIG. 3, the wireless alert attachment can provide the user with an alert to indicate the power level of the wireless alert attachment. As shown, in response to determining that the power level of the battery is less than about twenty percent at 330, the wireless alert attachment can flash one or more of the light emitting diodes on the wireless alert attachment in a particular pattern. As shown in FIG. 3, at 340, the wireless alert attachment can provide a visual alert, where a blue LED light blinks once per twelve seconds and a magenta LED light blinks once per five seconds. In some embodiments, the wireless alert attachment can also provide an auditory alert, where the wireless alert attachment chirps or provide another suitable sound one per ten minutes through a speaker in the wireless alert attachment. In some embodiments, the wireless alert attachment can provide a different auditory alert prior to shutting down the wireless alert attachment (e.g., when no battery power is left at 350). For example, at 360, the wireless alert attachment can increase the volume and play back a loud beep to indicate that the battery of the wireless alert attachment has been drained.

In some embodiments, as shown in FIG. 3, the wireless alert attachment can determine whether the mobile device is within range and initiate pairing or re-pairing with the mobile device.

Figure 1:
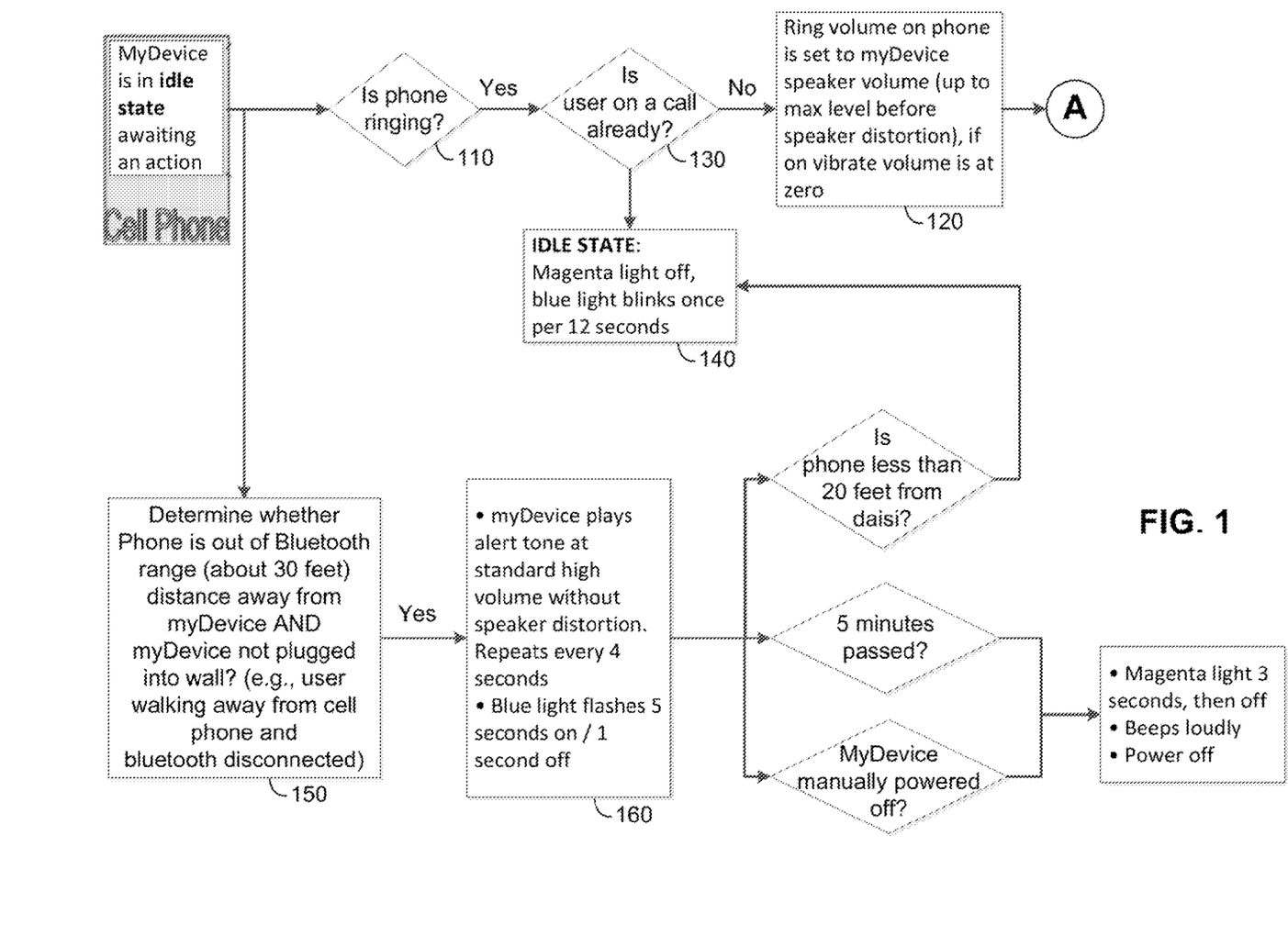
FIGS. 1 and 2 are flowcharts of an illustrative process for providing alerts on an alert device in response to associating with a mobile communications device and in response to detecting incoming communications to the mobile communications device in accordance with some embodiments of the disclosed subject matter.
Figure 2:
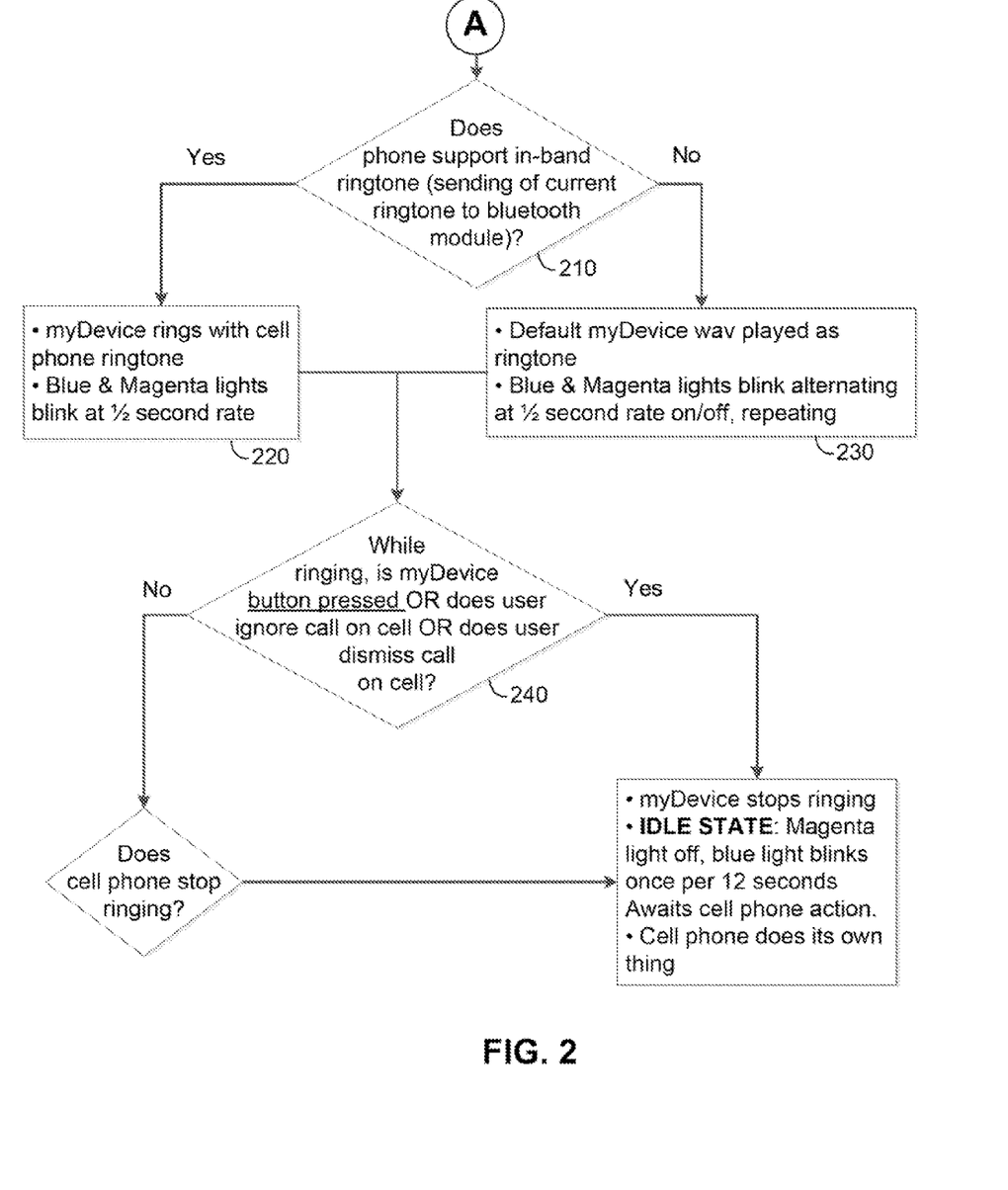

In some embodiments, the wireless alert attachment can provide the user with an alert to indicate incoming calls received by a mobile device. For example, as shown in FIGS. 1 and 2, in response to detecting that the mobile device is receiving an incoming call at 110, the wireless alert attachment can, via a communications channel, retrieve a ringtone or any other suitable audio file from the mobile device and playback the ringtone through an audio amplifier component of the wireless alert attachment. In some embodiments, as shown in FIGS. 1 and 2, the wireless alert attachment can receive any suitable device settings from the mobile device—e.g., a ring volume setting at 120, a vibrate setting at 120, a ringtone transmission support setting at 210, etc. For example, in response to receiving the ringtone transmission support setting at 210 and determining that in-band transmission of ringtones is support, the wireless alert attachment can receive one or more ringtones that can be played back when a call or other incoming communication to the mobile device is received at 220. Alternatively, the wireless alert attachment can playback a default ringtone in response to detecting a call or other incoming communication to the mobile device.

It should be noted that, in some embodiments, the wireless alert attachment can determine whether the mobile device has the capability to transfer mobile device settings, such as ringtones, ring volume settings, etc. from the mobile device to the wireless alert attachment. For example, in response to determining that the mobile device does not have such a capability, the wireless alert attachment can refer to default settings—e.g., a default ringtone, a default ring volume setting, a default LED blinking pattern, etc. In another example, in response to determining that the mobile device does have such a capability, the wireless alert attachment can retrieve one or more ringtones from the mobile device (e.g., a ringtone associated with a particular contact), a ringtone volume (e.g., the same ringtone volume as set in the mobile device), a volume profile from mobile device, etc.

The wireless alert attachment can also, in some embodiments, provide the user with a visible alert (e.g., intermittently flashing multiple light emitting diodes) and/or a vibratory alert that vibrates the wireless alert attachment. For example, as shown in FIG. 2, in response to receiving an incoming call, blue and magenta LED lights on the wireless alert attachment can be flashed at a particular rate (at 220 and 230).

It should be noted that, in some embodiments, the alerts provided by the wireless alert attachment can be suppressed by depressing a button on the wireless alert attachment. For example, at 240 of FIG. 2, the wireless alert attachment can determine whether the button is pressed or another suitable action (e.g., ignore call on mobile device, dismiss call on mobile device, etc.) and, in response, inhibit the wireless alert attachment from continuing to playback the ringtone on the speaker at the ring volume setting and from flashing particular LED lights.

Referring back to FIG. 1, in some embodiments, the wireless alert attachment can detect the status of the mobile device. For example, if the mobile device is currently on a call and the mobile device receives another call at 130, the wireless alert attachment can cause the incoming call to be ignored at 140 (e.g., no auditory alert that plays back the ringtone, but a visual alert to indicate the received call). Alternatively, the wireless alert attachment can be configured to provide the one or more alerts described above. This can allow the user to, for example, continue with the current call without requiring the user to pull the mobile telephone away from the user's ear to obtain information about the incoming call.

In yet another example, as also shown in FIG. 1, the wireless alert attachment can provide the user with a location alert. For example, the wireless alert attachment can, using the communications between the wireless alert attachment and the mobile device, determine the distance between the wireless alert attachment and the mobile device at 150. In response to determining that the distance between the wireless alert attachment and the mobile device is greater than a predetermined distance (e.g., ten meters), the wireless alert attachment can provide an alert indicating that the user recover or locate the mobile device as it may be lost, misplaced, and/or stolen at 160. This can include, for example, an alert tone that is played back at a high volume through the speaker and/or a visual alert that flashes LED lights in a particular pattern. The alert tone can be, for example, an audio file, such as an alerting WAV file, that is played on the wireless alert attachment. In a more particular example, the wireless alert attachment can transmit association information to the mobile device to determine whether the mobile device is in range. Upon determining that the wireless alert attachment is out of range (e.g., cannot associate with the mobile device) and, after a particular number of connection attempts (e.g., after repeated association attempts over the next thirty seconds), the wireless alert attachment can provide an alert on the wireless alert attachment.

In some embodiments, the wireless alert attachment can determine the signal strength of the Bluetooth or other communications signal between the wireless alert attachment and the mobile device. In response to determining the signal strength of the Bluetooth or other wireless connection between the wireless alert attachment and the mobile device, the wireless alert attachment can determine whether to transmit an alert to the mobile device user (e.g., upon determining that the signal strength has fallen below a predefined signal strength for a particular period of time).

Figure 4:
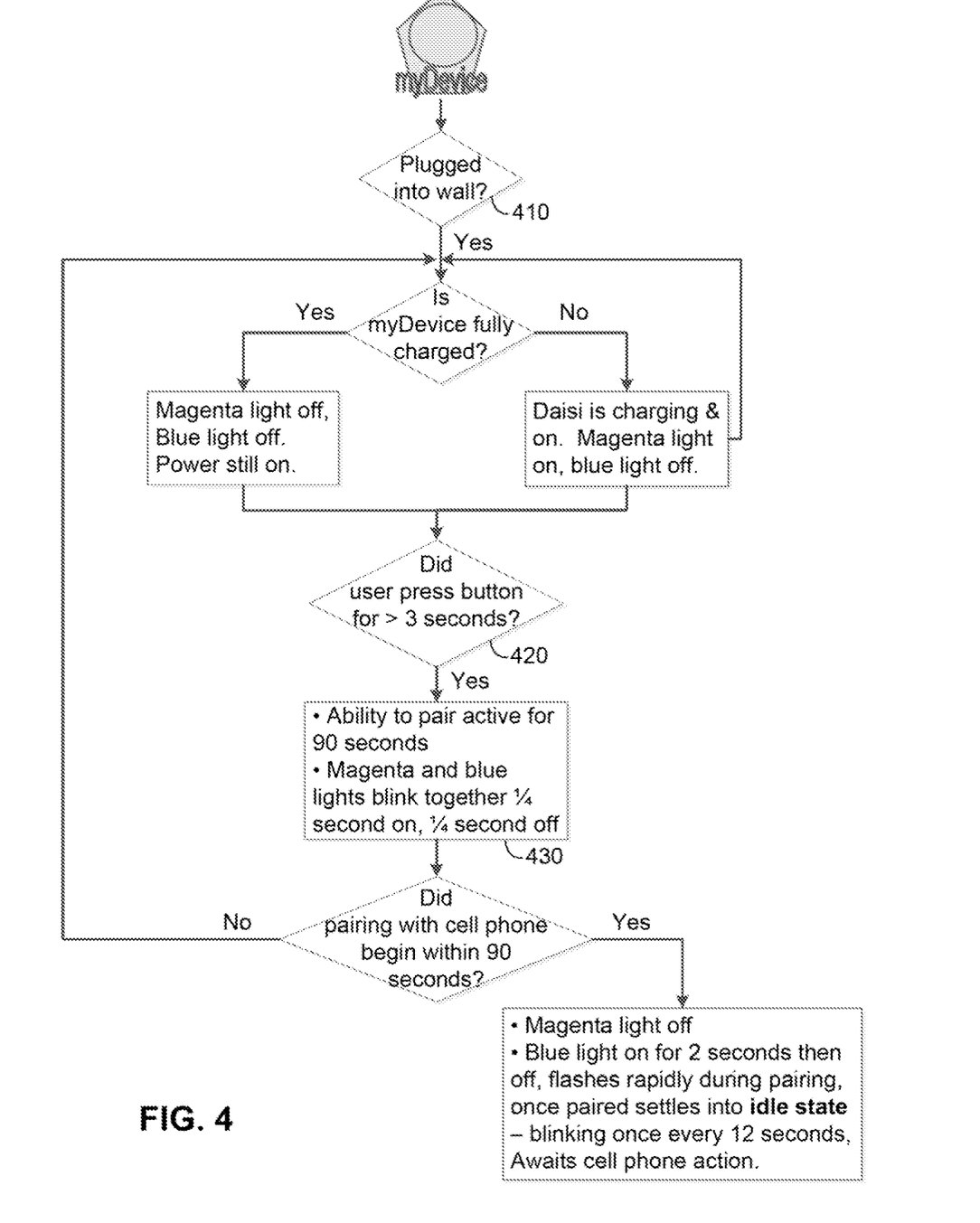

In some embodiments, the wireless alert attachment can activate and deactivate particular features based on power scheme. For example, as described above, in response to determining that the wireless alert attachment has been turned on and is not charging (e.g., plugged into an outlet through a universal serial bus connection (USB) on the wireless alert attachment, the wireless alert attachment can attempt to associate with one or more mobile devices (e.g., determine whether known mobile devices are in range and associating with those devices). In another example, as shown in FIG. 4, in response to determining that the wireless alert attachment is charging (e.g., by being connected to a power outlet) at 410, the wireless alert attachment can be paired with one or more mobile devices at 420 and 430. If the associated mobile device loses its connection with the wireless alert attachment (e.g., the Bluetooth connection is disconnected), the wireless alert attachment can inhibit the above-mentioned alerts (e.g., the alerting WAV file, the flashing of LED lights, etc.) from being provided. In a more particular example, the above-mentioned distance alert or location alert can be disabled when the wireless alert attachment is charging (e.g., by being connected to a power outlet).

In some embodiments, the wireless alert attachment can only allow the wireless alert attachment to be associated with new mobile devices in response to detecting that the wireless alert attachment is charging (e.g., has been connected to a power outlet).

Figure 5:
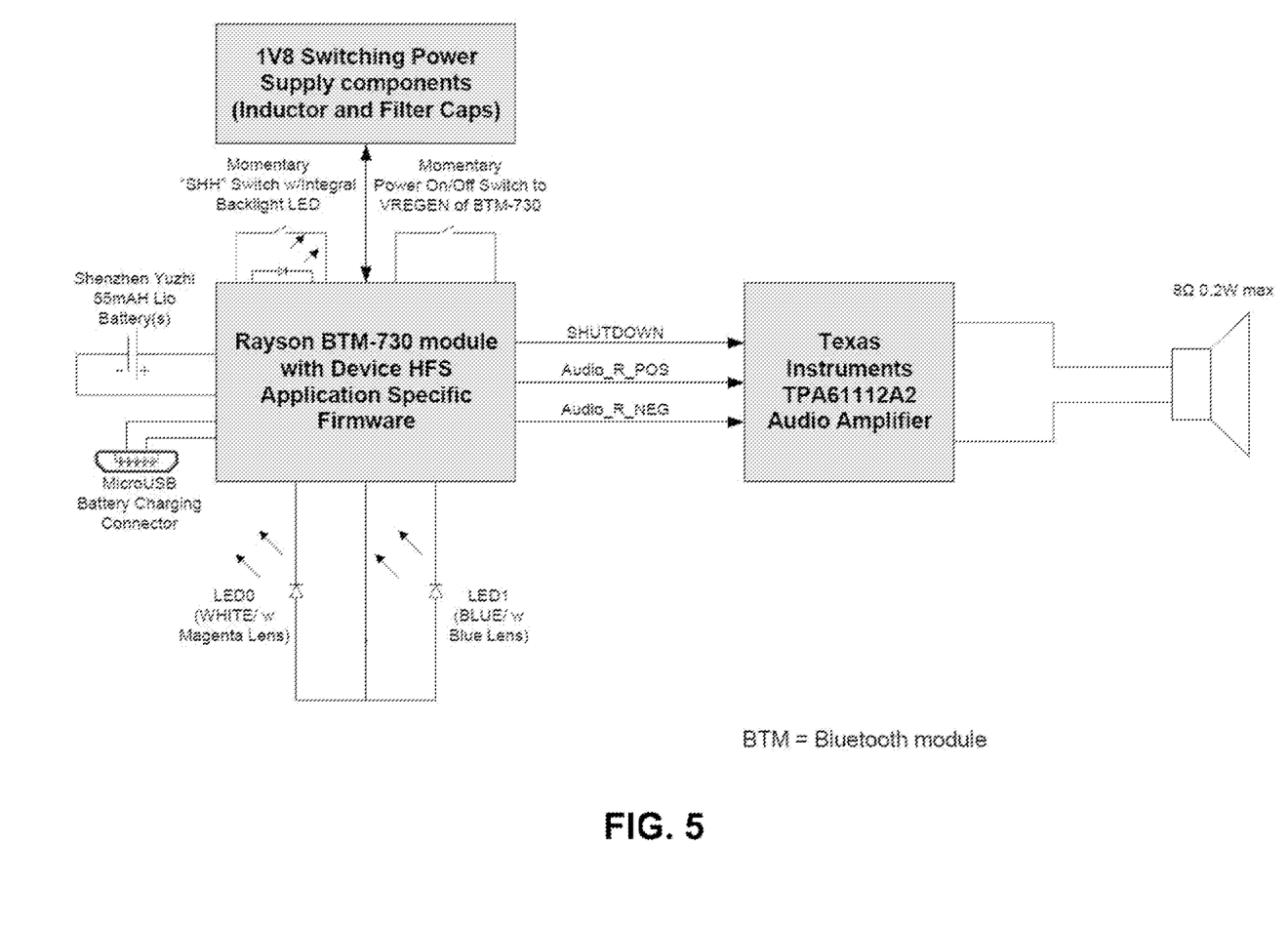
FIG. 5 is a block diagram of an illustrative alert device in accordance with some embodiments of the disclosed subject matter.
Figure 6A:
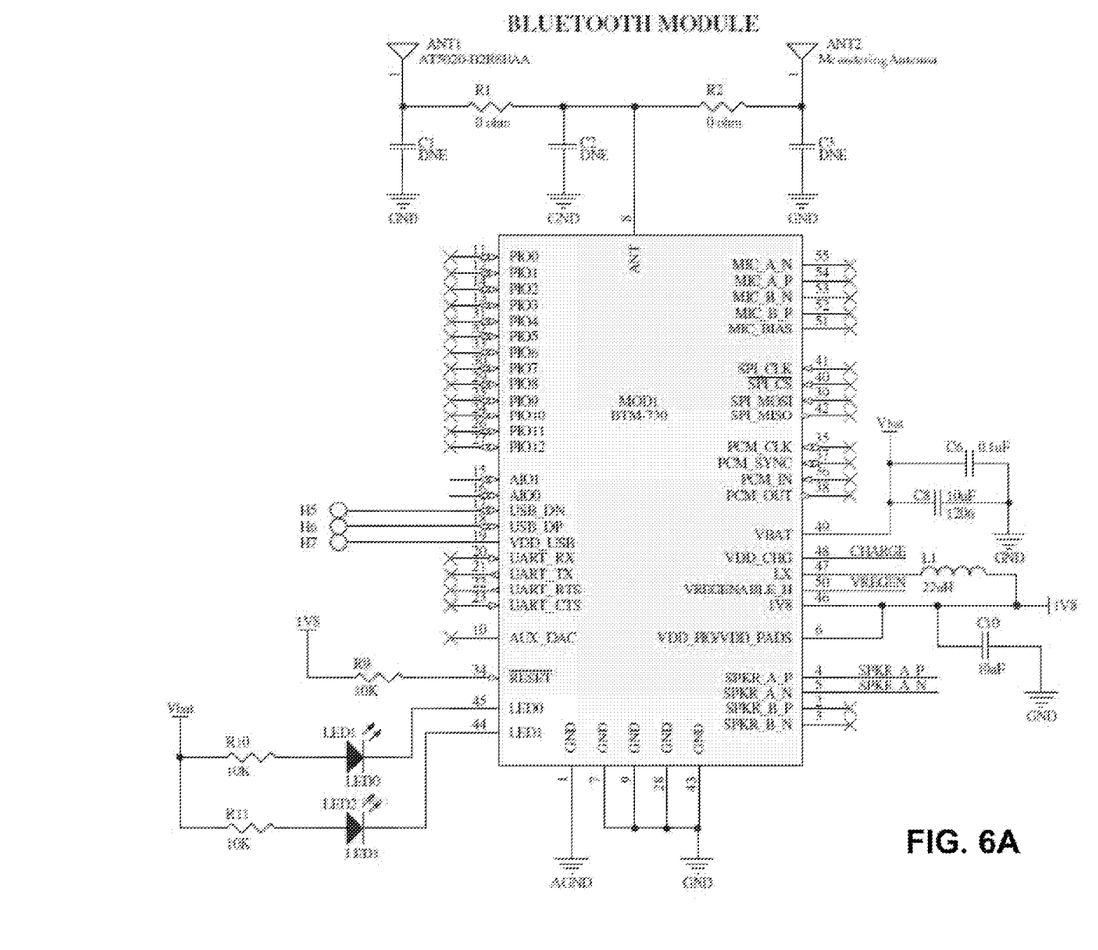
FIGS. 6A-6C show a schematic circuit diagram of the various components within an alert device in accordance with some embodiments of the disclosed subject matter.
Figure 6B:
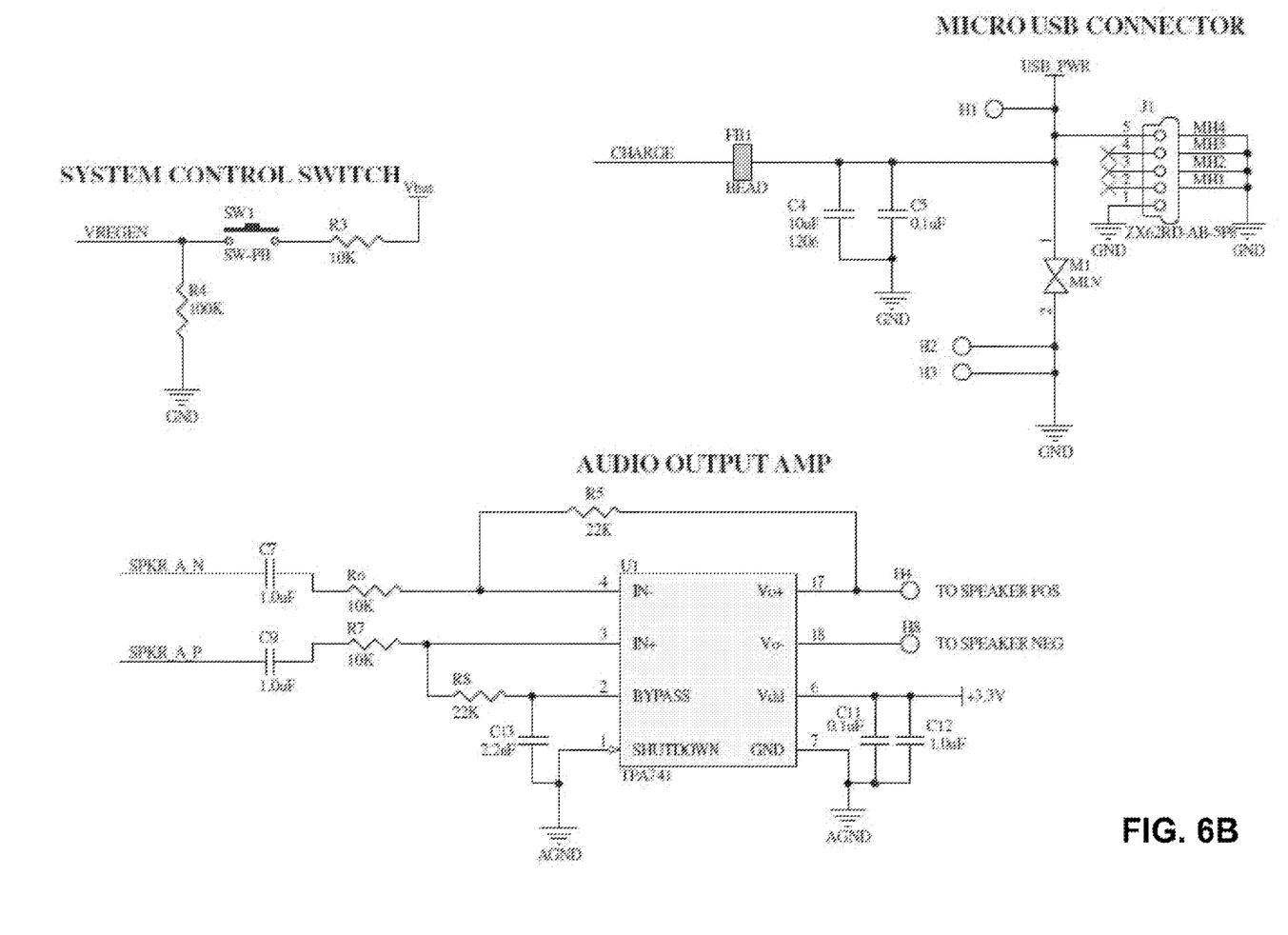
Figure 6C:
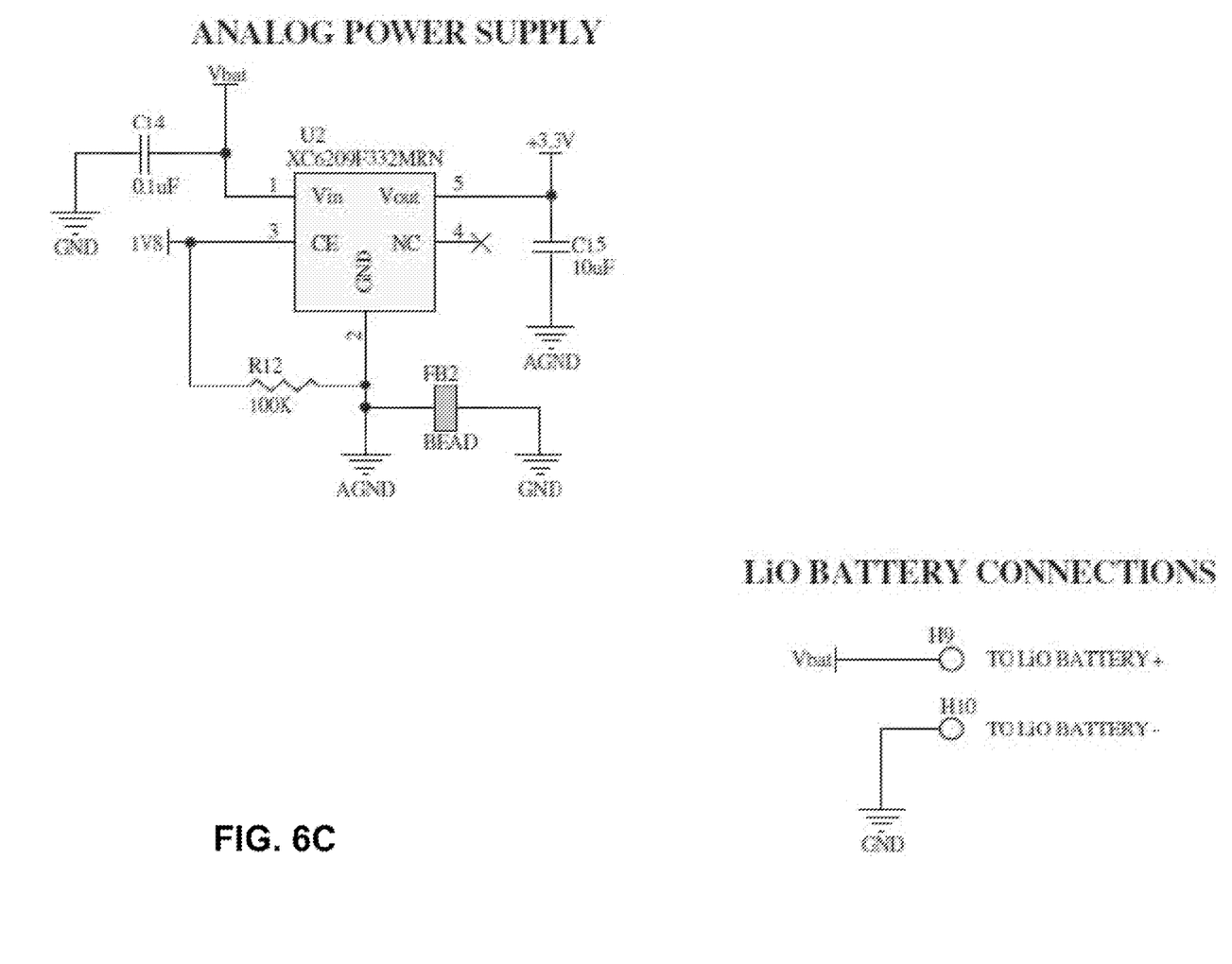

FIGS. 5 and 6A-6C provide illustrative schematic diagram of an exemplary wireless alert attachment in accordance with some embodiments of the disclosed subject matter. As shown in FIG. 5, the wireless alert attachment can include control circuitry. The control circuitry can be based on any suitable processing circuitry, such as one or more microprocessors, microcontrollers, digital signal processors, programmable logic devices, field-programmable gate arrays, application-specific integrated circuits, etc. As shown in FIG. 5, the control circuitry can be used to control one or more audio amplifiers, speakers, power supply components, light emitting diodes, and/or any other component within the wireless alert attachment. FIGS. 6A-6C provide a schematic circuit diagram of the components within the wireless alert attachment shown in FIG. 5.

Any suitable hardware and/or software can be used to perform the mechanisms described herein. For example, a general purpose device such as a computer or a special purpose device such as a client, a server, etc. can be used to execute software for performing the mechanisms described herein. Any of these general or special purpose devices can include any suitable components such as a hardware processor (which can be a microprocessor, digital signal processor, a controller, etc.), memory, communication interfaces, display controllers, input devices, etc. This hardware and/or software can be implemented as part of other equipment or can be implemented as stand-alone equipment (which can be coupled to other equipment).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, an alert device for mobile devices is provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. An alert device for a mobile communications device, the alert device comprising:
    a housing that includes control circuitry, wherein the control circuitry is configured to:
        associate wirelessly with the mobile communications device;
        in response to associating with the mobile communications device, receive a plurality of mobile communications device settings associated with the mobile device, wherein the plurality of mobile communications device settings include a ringtone corresponding to incoming communications and a ring volume setting;
        detect an incoming communication to the mobile communications device;
        determine a status of the mobile communications device in response to detecting the incoming communication; and
        provide an alert to a user of the mobile communications device, wherein:
            in response to detecting that the incoming communication is a call and the status of the mobile communications device indicates that the mobile communications device is available, provide the alert that includes playing back the ringtone through a speaker connected to the control circuitry at the ring volume setting by determining whether the ring volume setting received from the mobile communications device is greater than a distortion volume setting associated with the speaker and playing back the ringtone through the speaker at the distortion volume setting in response to determining that the ring volume setting causes distortion in the speaker;
            in response to detecting that the incoming communication is a call and the status of the mobile communications device indicates that the mobile communications device is engaged on another call, provide the alert that includes flashing one or more light emitting diodes connected to the control circuitry; and
            in response to detecting that the status of the mobile communications device indicates that the mobile communications device is a distance away from the alert device, provide the alert that includes an audible alarm through the speaker and flashing the one or more light emitting diodes.

2. The alert device of claim 1, wherein the control circuitry is further configured to provide a vibratory alert along with the alarm.

3. The alert device of claim 1, wherein the control circuitry is further configured to:
    transmit association information to the mobile communications device; and
    provide the alert in response to determining that the mobile communications device is a distance away from the alert device based on the association information.

4. The alert device of claim 1, wherein the control circuitry is further configured to:
    determine signal strength of a communications signal with the mobile communications device; and
    provide the alert based at least in part on the determined signal strength.

5. The alert device of claim 1, wherein the control circuitry is further configured to associate with a plurality of mobile communications devices, wherein the plurality of mobile communications device settings associated with each of the plurality of mobile communications devices is received.

6. The alert device of claim 5, wherein the control circuitry is further configured to provide a first alert corresponding to a first mobile communications device of the plurality of mobile communications devices and provide a second alert corresponding to a second mobile communications device of the plurality of mobile communications devices.

7. The alert device of claim 1, wherein the one or more light emitting diodes includes a first light emitting diode of a first color and a second light emitting diode of a second color and wherein the control circuitry is further configured to flash the first light emitting diode in response to detecting a first communication and flash the second light emitting diode in response to detecting a second communication.

8. The alert device of claim 1, wherein the housing further includes a button, wherein the control circuitry is further configured to suppress the alert in response to determining that the button has been depressed.

9. The alert device of claim 1, wherein the control circuitry is further configured to determine whether the mobile communications device has a transfer capability for transmitting the ringtone.

10. The alert device of claim 9, further comprising a memory, wherein the control circuitry is further configured to retrieve a default ringtone stored in the memory to playback through the speaker in response to determining that the mobile communications device does not have the transfer capability.

11. The alert device of claim 9, further comprising a memory, wherein the control circuitry is further configured to retrieve the ringtone from the mobile communications device and store the ringtone in the memory in response to determining that the mobile communications device has the transfer capability.

12. The alert device of claim 1, wherein the control circuitry is further configured to determine whether the mobile communications device has a transfer capability for transmitting the ring volume setting.

13. The alert device of claim 12, further comprising a memory, wherein the control circuitry is further configured to retrieve a default ring volume setting stored in the memory in response to determining that the mobile communications device does not have the transfer capability.

14. The alert device of claim 12, further comprising a memory, wherein the control circuitry is further configured to retrieve the ring volume setting from the mobile communications device and store the ring volume setting in the memory in response to determining that the mobile communications device has the transfer capability.

15. An alert device for a mobile communications device, the alert device comprising:
- a housing that includes control circuitry, wherein the control circuitry is configured to:
  - associate wirelessly with the mobile communications device;
  - determine that the alert device has been connected to an external power source;
  - disassociate with the mobile communications device;
  - allow additional mobile communications devices to be associated with the alert device;
  - associate wirelessly with a second mobile communication device;
  - in response to associating with the second mobile communications device, receive a plurality of mobile communications device settings associated with the second mobile communication device, wherein the plurality of mobile communications device settings include a ringtone corresponding to incoming communications and a ring volume setting;
  - detect an incoming communication to the second mobile communications device;
  - determine a status of the second mobile communications device in response to detecting the incoming communication; and
  - provide an alert to a user of the second mobile communications device, wherein:
    - in response to detecting that the incoming communication is a call and the status of the second mobile communications device indicates that the second mobile communications device is available, provide the alert that includes playing back the ringtone through a speaker connected to the control circuitry at the ring volume setting;
    - in response to detecting that the incoming communication is a call and the status of the second mobile communications device indicates that the second mobile communications device is engaged on another call, provide the alert that includes flashing one or more light emitting diodes connected to the control circuitry; and
    - in response to detecting that the status of the second mobile communications device indicates that the second mobile communications device is a distance away from the alert device, provide the alert that includes an audible alarm through the speaker and flashing the one or more light emitting diodes.

* * * * *